Oct. 8, 1968  Y. C. BELENTEPE ET AL  3,404,974
COOLING ARRANGEMENT FOR GLASS FORMING EQUIPMENT
Filed April 21, 1965  2 Sheets-Sheet 1
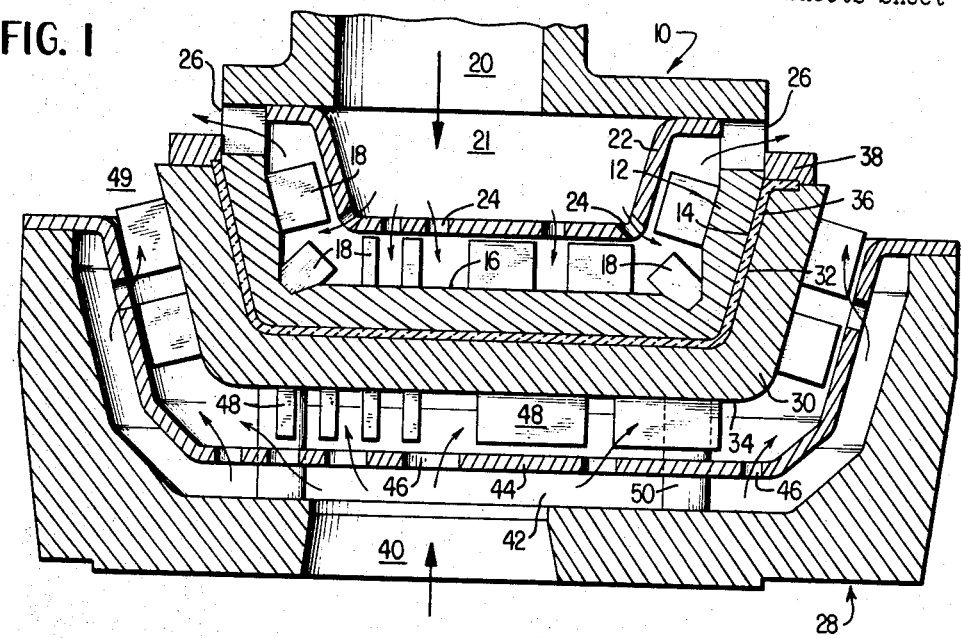
FIG. 1
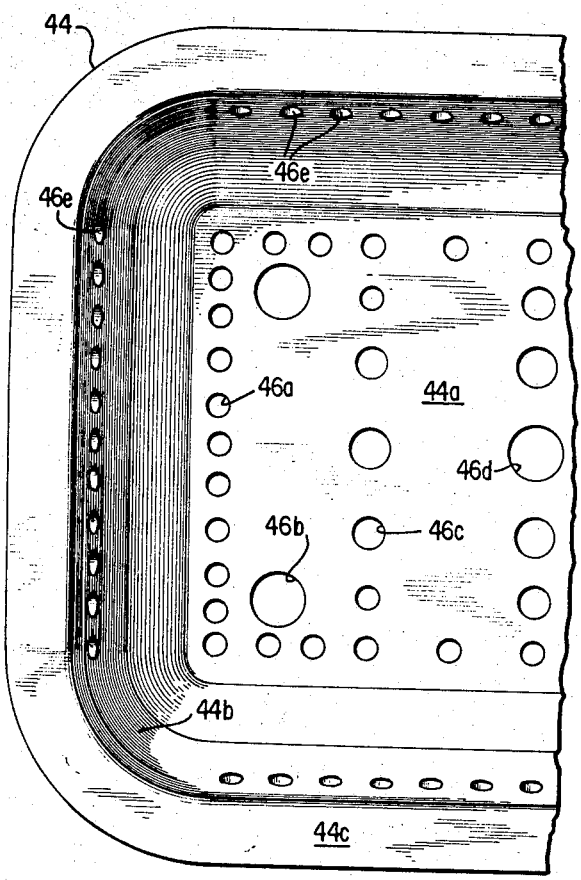
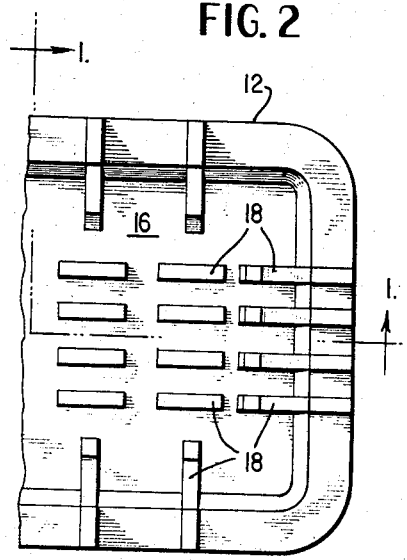
FIG. 2
FIG. 3
INVENTORS.
YILMAZ C. BELENTEPE
ARIEH CARMI
BY
ATTORNEYS.

INVENTORS.
YILMAZ C. BELENTEPE
ARIEH CARMI

BY
ATTORNEYS.

United States Patent Office 3,404,974
Patented Oct. 8, 1968

3,404,974
COOLING ARRANGEMENT FOR GLASS
FORMING EQUIPMENT
Yilmaz C. Belentepe and Arieh Carmi, Corning, N.Y.,
assignors to Corning Glass Works, Corning, N.Y., a
corporation of New York
Filed Apr. 21, 1965, Ser. No. 449,755
2 Claims. (Cl. 65—319)

ABSTRACT OF THE DISCLOSURE

An air cooled glass press plunger and mold each have coolant passages adjacent mold surfaces to be cooled. Air introduced from a single central cooling inlet and plenum chamber is directed by openings in a relatively thin flat air distributing and control plate spaced from the outer mold surface directly on to the surfaces to be cooled. The air in contact with the mold is guided in a cumulative manner for generally non-channeled radial flow over the surface to be cooled in order to further enhance the effectiveness of the air used.

---

This invention relates to improvements in cooling arrangements for glass forming equipment.

The equipment used for forming glassware, commonly a press having a mold and a plunger, must be controllably cooled in order to provide a uniformly cooled mold cavity and properly formed ware. If the glass forming surfaces of the mold or plunger are too hot the glassware formed may be defective. Similarly, if only a portion of the glass forming mold is too hot, the glassware formed may be defective. Accordingly, it is the object of this invention to provide an arrangement for controlling the temperature, and in particular controllably cooling the glass forming elements of glass forming equipment, by a unique provision for control of the flow of fluid coolant from an inlet to a cooling surface of the glassware forming mold element.

In the conventional prior art air cooled glass forming equipment customarily is provided with an inlet for air at the center of the mold base or plunger head and air passing through this mold comes in contact with the cooling side of the mold equipment and leaves through an opening provided in the base of the mold or plunger head. This prior known arrangement provides for cooling of the mold components but is difficult with respect to adequately cooling all portions of the mold equipment evenly, i.e., it is difficult to achieve a desired temperature distribution and, moreover the pressure drop of the air coolant is comparatively large.

This invention overcomes the disadvantages over the prior art conventional single air inlet type of mold equipment by applying the coolant, preferably air, at a plurality of selected locations on the cooling side of the mold equipment. This is accomplished by a single air distribution plate having a plurality of openings in it so that the cooling air coming from an inlet on one side of the plate passes through these openings with a low pressure drop and impinges directly on the cooling side of the mold equipment and cools the mold to provide a thermally controlled temperature on the surface of the mold. The air openings are chosen to match the configuration of the glass article being formed and may be selected for a given coolant and pressure of coolant as may be determined by trial and error or by calculation. A cooling chamber on the cooling side of the mold has a plurality of spaced apart discontinuous thin heat conducting fins to aid in the effective control of the flow of coolant.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a sectional elevation view through glass forming equipment of the type adapted for the production of a deep ware item which does not have rotational symmetry and incorporating the cooling arrangement of this invention; the section being taken along line 1—1 of FIG. 2;

FIG. 2 is a partial top plan view of the plunger of the glass forming equipment of FIG. 1;

FIG. 3 is a top plan view of an air control and distribution plate or shroud for the mold assembly of the glass forming equipment shown in FIG. 1;

Figure 4:
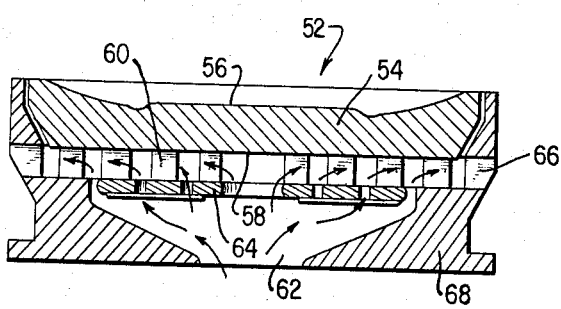
FIG. 4 illustrates another embodiment of this invention and is a sectional elevation view of a glass forming mold for a shallow symmetrical item illustrating the cooling arrangement of this invention applied thereto.

Referring to the drawings and to FIGS. 1–3 in particular, the glass forming equipment shown therein illustrates the cooling arrangement which is the subject of this invention as applied to glass forming equipment for producing a deep ware item which does not have rotational symmetry. The same principles can be applied to mold equipment for various ware shapes, including symmetrical ware shallow configuration of molds, plungers, etc. as will be illustrated in the FIGS. 4–6 embodiment.

In FIG. 1 there is shown a plunger assembly 10 which includes a plunger 12 providing a mold element and having a molding surface 14 and a cooling surface 16 on the back side thereof. Cooling fins 18 are attached to the cooling surface.

An inlet passage 20 is provided in plunger assembly 10 for fluid coolant such as air under pressure. A plenum chamber 21 is in fluid communication with inlet 20. An air control shroud or distribution plate 22 has a plurality of holes 24 judiciously placed in selected locations and of selected size and shape to accomplish cooling. Air passes through these holes and impinges on and cools surface 16 opposite the glass molding surface before exiting through outlet passages 26. The heat of the glass in the mold is transferred by conduction through the mold element (plunger 12) and is transferred by convection from the cooling surface 16 to the flowing coolant in a controlled manner.

The size and location of the coolant openings 24 vary with the desired cooling effect at any specific zone of the mold element, i.e. the plunger, or the mold in the case of the mold. These sizes and shapes can be calculated by means of well established fluid dynamic and thermal principles or determined by experimental trial and error techniques. The desired amount of cooling air at any specific location is governed by the pressure drop across the openings 24 in air control plate 22. The cooling effect at any discrete desired location is also enhanced by the jets of air passing through these holes directly impinging on the mold cooling surface 16.

The same cooling principles are equally applicable to a mold as well as a plunger. As shown in FIG. 1, a mold assembly 28 includes a glass mold element 30, having a molding surface 32 and a cooling surface 34. Molding surface 32 of the mold and surface 14 of the plunger define therebetween a molding cavity for the ware 36 and this cavity is closed at its upper end by a ring 38, as is known in the glass press art.

An inlet passage 40 leading into a plenum chamber 42 is provided for coolant such as air under pressure. In plenum chamber 42 air is distributed under pressure against the surface of air control shroud or distribution plate 44 which has a plurality of different sized and different spaced holes 46 therein to distribute the cooling air and to direct the impingement thereof against selected areas of the mold cooling surface 34. Again, the size and shape of these holes may be chosen either on the basis of calculation or trial and error. The mold cooling surface 34 has thin heat conducting fins 48 attached thereto and the cooling air exits large unrestricted coolant outlet 49 to the ambient. Suitable supports 50 are provided in order to provide the cooling space and the plenum chamber which allow for the space necessary for positioning the control shroud 44.

As shown in FIG. 2 the fins are laterally and longitudinally separated. This positioning of the fins controls the air flow by creating turbulence.

The arrangement of fins may further aid in the heat distribution as shown in FIG. 2 and the size and spacing of the holes or passages 46 in the air control shroud 44 is shown in more detail in FIG. 3. In this figure, the control shroud for a deep ware item would have a tray-like shape with a bottom 44a, inclined sides 44b and securing flanges 44c. Passages for coolant air through the shroud may include small passages 46a around the periphery of the base of the tray 44a, further spaced holes 46c suitably spaced along the bottom and interspersed with larger holes 46d, as desired. Additional small holes 46E may be in the inclined side 44b of the shroud. The previously mentioned supports 50 extend through the large holes 46b shown in FIG. 3.

Figure 5:
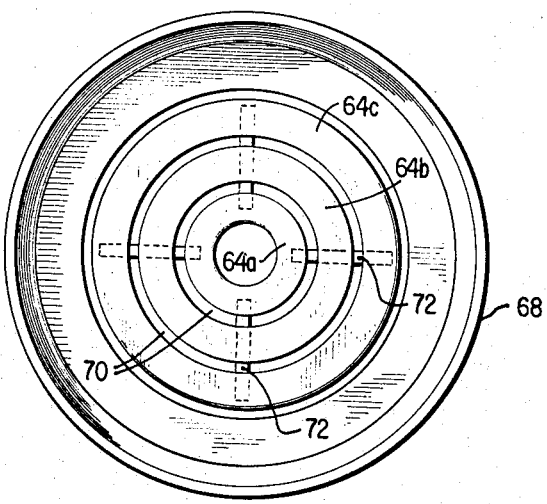
FIG. 5 is a top view of an air control plate used in the cooling arrangement of FIG. 4.
Figure 6:
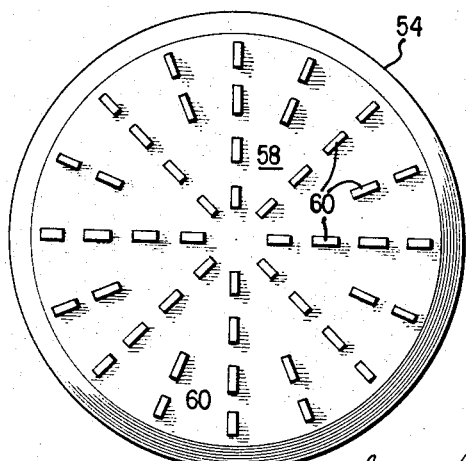
FIG. 6 is a bottom plan view of the cooling fins on the bottom of the mold shown in FIG. 4.

The principles of this invention are equally applicable to glass molds and plungers for shallow or flat ware with or without rotational symmetry, and a mold for symmetrical shallow ware is shown in the modification of FIGS. 4–6. In this embodiment mold assembly 52 includes a mold 54 having a molding surface 56 and a reverse cooling surface 58 to which thin heat conducting fins 60 are attached. These fins are radially and circumferentially separated as shown in FIG. 6. The cooling fluid enters into a central plenum chamber 62 in mold base 68 and must pass through openings 70 in air control plate or shroud 64 in order to impinge upon the cooling surface 58 and transfer the heat as it passes out large unrestricted coolant outlets 66.

The air control plate is made up in this case, for example, of a plurality of annular rings 64a, 64b and 64c, connected together by bars 72 to define therebetween annular air spaces 70. The size of these air spaces or passages through the air control plate is fixed for a particular pressing characteristic according to the governing rules of thermal balance for the mold equipment and the pressure drop for the air flow. The cooling air is supplied from the plenum chamber through the passages 70 at desired pressures, locations and distances from the mold cooling surface 34 so that it will selectively cool the mold as required.

It can be seen that this invention provides a unique cooling arrangement for glass forming equipment in which temperature distribution can be obtained on the glass contacting surface of the mold equipment because of flexibility in the arrangement for applying fluid coolant, and in which the pressure drop of the coolant across the mold equipment is lower than with prior designs because the bulk of the air flow is conveyed through the larger cross-sectional area of the plenum chamber 62 and parts of this amount of air are passed through the air control plate 64 at each required location.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A cooling arrangement for glass forming equipment of the type including a plunger assembly and a cooperating complementary mold assembly for molding generally flat ware, the plunger assembly and mold assembly each having a mold element with a glass molding surface and a cooling surface opposite the glass molding surface, the cooling arrangement comprising; a plenum chamber within each mold assembly generally coextensive with the cooling surface of the mold element, a cooling chamber within each mold assembly between the plenum and said cooling surface of the mold element, a coolant distribution and control plate forming a common wall between the plenum chamber and cooling chamber, coolant openings of preselected size and position throughout said plate, a plurality of thin heat conducting fins extending from the cooling surface of the mold into the cooling chamber, said fins separated from each other both laterally and longitudinally at a distance sufficient to cause turbulent flow of the coolant within the cooling chamber, and a large unrestricted coolant outlet adjacent an edge surface of the mold element.

2. A cooling arrangement for glass forming equipment of the type including a plunger assembly and a cooperating complementary mold assembly for molding generally flat ware, the plunger assembly and mold assembly each having a mold element with a glass molding surface and a cooling surface opposite the glass molding surface, the cooling arrangement comprising; a plenum chamber within each mold assembly generally coextensive with the cooling surface of the mold element, a cooling chamber within each mold assembly between the plenum and said cooling surface of the mold element, a coolant distribution and control plate forming a common wall between the plenum chamber and cooling chamber, coolant openings of preselected size and position throughout said plate, a plurality of thin heat conducting fins extending from the cooling surface of the mold into the cooling chamber, said fins separated from each other both radially and circumferentially at a distance sufficient to cause turbulent flow of the coolant within the cooling chamber, and a large unrestricted coolant outlet adjacent an edge surface of the mold element.

References Cited

UNITED STATES PATENTS 3,024,571   3/1962   Abbott et al. _____ 65—319 X
3,291,588   12/1966  Lippmann et al. _____ 65—319

DONALL H. SYLVESTER, *Primary Examiner.*

ARTHUR D. KELLOGG, *Assistant Examiner.*